No. 861,044. PATENTED JULY 23, 1907.
C. A. NAUMAN.
HOOK.
APPLICATION FILED DEC. 19, 1906.
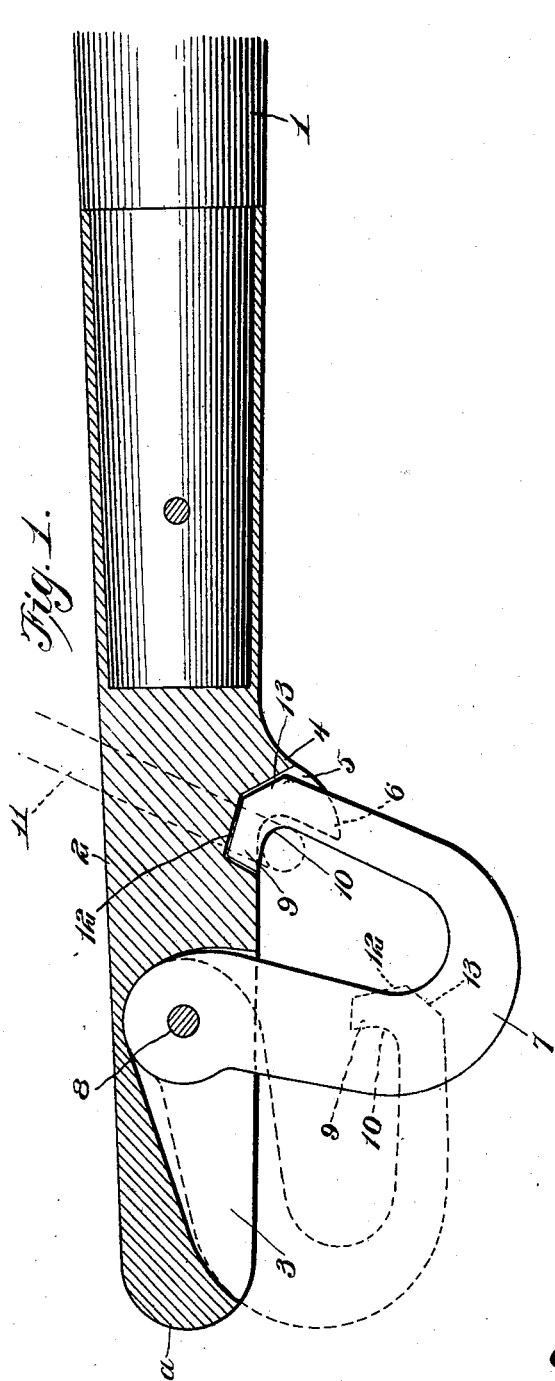
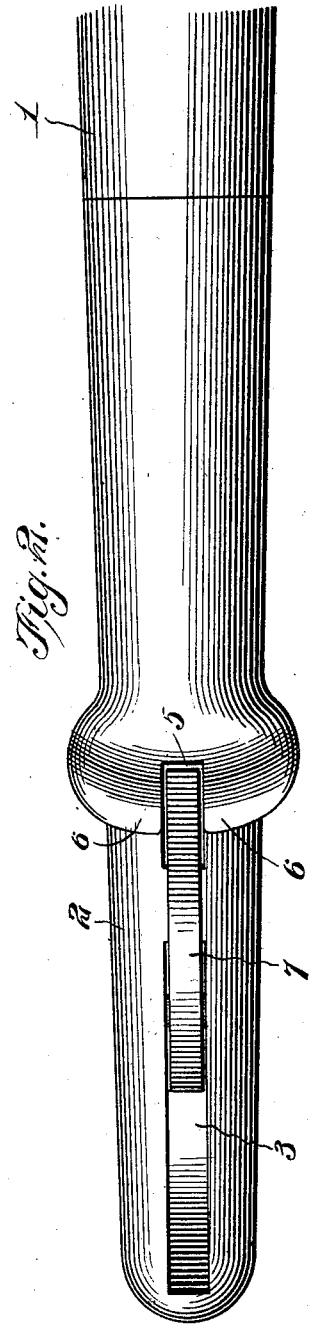
Inventor
Charles A. Nauman
Witnesses
Louis R. Heinrichs
By Victor J. Evans
Attorney

UNITED STATES PATENT OFFICE.

CHARLES A. NAUMAN, OF WILKES-BARRE, PENNSYLVANIA.

HOOK.

No. 861,044.      Specification of Letters Patent.      Patented July 23, 1907.

Application filed December 19, 1906. Serial No. 348,599.

*To all whom it may concern:*

Be it known that I, CHARLES A. NAUMAN, a citizen of the United States of America, residing at Wilkes-Barre, in the county of Luzerne and State of Pennsylvania, have invented new and useful Improvements in Hooks, of which the following is a specification.

This invention relates to hooks, more especially designed for use as a vehicle pole hook for supporting the neck yoke, but which is capable of use as a whiffletree hook, and one of the principal objects of the same is to provide a simple and reliable hook for vehicle poles which will securely hold the neck yoke ring in place thereon, and permit its ready removal whenever required.

Another object of the invention is to provide a hook for the purposes referred to, which is adapted to be seated in a recess in the pole tip or the whiffletree end, and the terminal end of the hook having a curved portion to engage with the neck yoke ring or the cock-eye at the end of a trace.

These and other objects may be attained by means of the construction illustrated in the accompanying drawings, in which:

Figure 1 is a longitudinal sectional view of a vehicle pole tip showing my hook pivoted thereto. Fig. 2 is a plan view of the same, looking at the underside of the pole tip.

Referring to the drawing for a more particular description of my invention, the numeral 1 designates a vehicle pole, and 2 is the pole tip, which is provided with an open slot or recess 3 in the underside thereof, and an enlargement 4 provided with a slot 5 therein which provides downwardly and forwardly extending lugs 6 which are spaced apart sufficiently to admit the terminal end of the hook 7. The hook 7 is provided with a pintle 8 upon which the hook is pivoted within the slot 3. The terminal end of the hook is provided with an inwardly extending lug 9 having a curved under surface 10 which is adapted to be engaged by the neck yoke ring 11 or the cock-eye of a trace. The end of the hook is provided with a plane flat upper surface 12, and an angular surface 13, said surfaces conforming to the walls of the slot 5 in the pole tip, as shown more particularly in Fig. 1. To engage the ring 11 with the hook, the latter is swung to the position shown in dotted lines in Fig. 1, and the neck yoke ring 11 is passed from the underside of the pole over the terminal end 9 of the hook, and is then carried around and over the end *a* of the pole tip. The hook is then swung to the position shown in full lines in Fig. 1, and the ring 11 is engaged with the curved portion 10 of the hook. In this position the ring cannot become detached from the hook accidentally, and when the ring is to be removed from the hook, it is moved outwardly on the pole tip and the hook is thrown to the dotted line position, when the ring can be passed around the end of the pole tip and backwardly over the terminal end 9 of the hook.

From the foregoing it will be obvious that a hook made in accordance with my invention will hold a neck yoke ring or cock-eye reliably in place, and that the construction is simple, composed entirely of two parts which cannot readily get out of order and which can be constructed at slight cost.

Having thus described the invention, what I claim is:

1. In a hook of the character described, a pole tip provided with a recess in its underside in which the hook is pivoted, and a recess for the terminal end of the hook, lugs extending from the opposite sides of said recess, and a hook pivoted in the first mentioned recess and provided with a terminal end projected toward the hook, and provided with a curved portion to engage the neck yoke ring, substantially as described.

2. A pole tip provided with a recess in its under side and forwardly extending spaced lugs, in combination with a hook pivoted in said recess and provided with an inwardly projecting hook end, and a curved portion to engage the neck yoke ring, substantially as described.

In testimony whereof, I affix my signature in presence of two witnesses.

CHARLES A. NAUMAN.

Witnesses:
    F. S. HOLMES,
    ROBT. J. BLAIR.